(12) United States Patent
Iwaki et al.

(10) Patent No.: US 10,364,875 B2
(45) Date of Patent: Jul. 30, 2019

(54) MICRO-TRACTION DRIVE UNIT AND HYDROSTATIC TRANSMISSION

(71) Applicant: Kanzaki Kokyukoki Mfg. Co., Ltd., Amagasaki-shi, Hyogo (JP)

(72) Inventors: Koji Iwaki, Amagasaki (JP); Etsuo Miyake, Amagasaki (JP)

(73) Assignee: Kanzaki Kokyukoki Mfg. Co., Ltd., Amagasaki-shi, Hygo (JP)

( * ) Notice: Subject to any disclaimer, the term of this patent is extended or adjusted under 35 U.S.C. 154(b) by 0 days.

(21) Appl. No.: 15/528,994

(22) PCT Filed: Feb. 17, 2016

(86) PCT No.: PCT/JP2016/054499
§ 371 (c)(1),
(2) Date: May 23, 2017

(87) PCT Pub. No.: WO2016/140059
PCT Pub. Date: Sep. 9, 2016

(65) Prior Publication Data
US 2017/0335939 A1   Nov. 23, 2017

(30) Foreign Application Priority Data

Mar. 3, 2015 (JP) ................................. 2015-040883

(51) Int. Cl.
*F16H 47/04* (2006.01)
*F16H 39/14* (2006.01)
(Continued)

(52) U.S. Cl.
CPC ............. *F16H 47/04* (2013.01); *F16H 13/08* (2013.01); *F16H 39/10* (2013.01); *F16H 39/14* (2013.01);
(Continued)

(58) Field of Classification Search
CPC .......... F16H 13/08; F16H 13/06; F16H 47/04; F16H 2047/045
See application file for complete search history.

(56) References Cited

U.S. PATENT DOCUMENTS

| | | | | |
|---|---|---|---|---|
| 3,471,208 A | * | 10/1969 | Vannest | F16C 33/3868 384/530 |
| 3,793,907 A | * | 2/1974 | Nakamura | F16H 15/50 475/114 |
| 2017/0152929 A1 | * | 6/2017 | Sugimoto | F16H 39/14 |

FOREIGN PATENT DOCUMENTS

| | | |
|---|---|---|
| JP | 56-20858 A | 2/1981 |
| JP | S56-020858 A | 2/1981 |

(Continued)

OTHER PUBLICATIONS

Enghsh Translation of International Preliminary Report on Patentability issued in International Application No. PCT/JP2016/054499, dated Sep. 14, 2017.

(Continued)

*Primary Examiner* — Jacob S. Scott
*Assistant Examiner* — Lori Wu
(74) *Attorney, Agent, or Firm* — Sterne, Kessler, Goldstein & Fox P.L.L.C.

(57) ABSTRACT

A micro-traction drive unit according to the present invention includes an inner ring, an outer ring, a plurality of rolling elements, a retainer, a micro-traction drive case and a power-transmitting shaft coaxial with the inner ring and incapable of relative rotation around an axis to the retainer. An opposite end of the power-transmitting shaft from the inner ring forms an input end operatively connected to a driving source. An input end of the pump shaft is detachably connected to a central hole of the inner ring in a state incapable of relative rotation around the axis via the access opening of the micro-traction drive case by connecting the micro-traction drive case to the HST case so as to surround the input end of the pump shaft of the HST.

9 Claims, 9 Drawing Sheets

(51) Int. Cl.
 *F16H 13/08* (2006.01)
 *F16H 39/10* (2006.01)
 *F15B 11/08* (2006.01)
(52) U.S. Cl.
 CPC ..... *F15B 11/08* (2013.01); *F15B 2211/20546* (2013.01); *F15B 2211/705* (2013.01)

(56) References Cited

FOREIGN PATENT DOCUMENTS

| JP | 59-208257 A | 11/1984 |
| JP | S59-208257 A | 11/1984 |
| JP | 05-010406 A | 1/1993 |
| JP | H05-010406 A | 1/1993 |
| JP | 2010-38191 A | 2/2010 |
| JP | 2010-038191 A | 2/2010 |
| JP | 2011-085153 | 4/2011 |
| JP | 2011-85153 A | 4/2011 |
| JP | 4701366 B2 | 6/2011 |

OTHER PUBLICATIONS

International Search Report dated May 17, 2016 for International Application No. PCT/JP2016/054499, ISA/JPO, Tokyo Japan.
Japanese Office Action dated Jun. 22, 2018 in corresponding Japanese Patent Application 2015-040883.

* cited by examiner

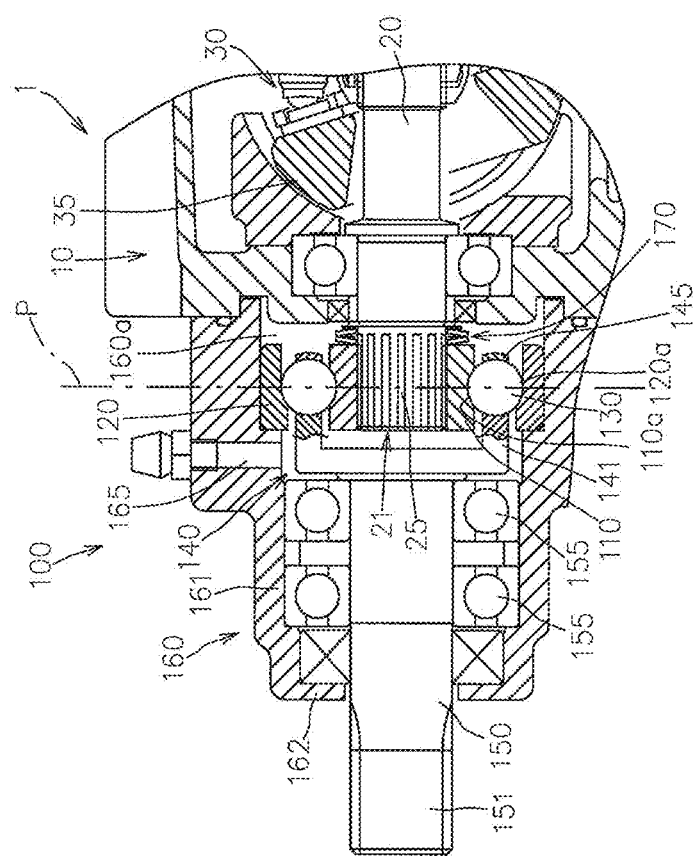

MICRO-TRACTION DRIVE UNIT AND HYDROSTATIC TRANSMISSION

FIELD OF THE INVENTION

The present invention relates to a micro-traction drive unit and a hydrostatic transmission (HST).

BACKGROUND ART

A hydrostatic transmission (HST), in which a hydraulic pump and a hydraulic motor that are fluidly connected to each other and at least one of which is a variable volume type are respectively supported by a pump shaft and a motor shaft so as to be incapable of relative rotation and are accommodated in an HST case, is suitable for use in a drive-train power transmission path in utility vehicles such as riding lawn mowers and tractors (see Patent Document 1 below).

The above HST is useful in that it is capable of varying in a stepless manner the rotational speed of rotary power that is operatively input from the driving source into the pump shaft and outputting the resulting rotary power having a varied rotational speed from the motor shaft.

Meanwhile, for reducing the cost of a power transmission path, it is preferable to use general-purpose products for power transmission path components such as a driving source and an HST, but there are the following problems in such cases.

That is, when choosing a general-purpose HST, it is necessary to choose an HST having an allowable input rotational speed that is greater than the rated output rotational speed (the rated revolutions) of a driving source.

At that time, a general-purpose HST, the allowable input rotational speed of which is slightly greater than the rated output rotational speed of a driving source, is not always available, and, for example, there may be a case where a general-purpose HST, the allowable input rotational speed of which is 3500 rpm, has to be used with a driving source having a rated output rotational speed of 2600 rpm.

In such a case, only about 70% of the capacity of the HST is utilized, meaning that the performance of the HST is not fully utilized.

Here, in order to bring the speed of rotary power input into the pump shaft close to the allowable input rotational speed of the HST, it is conceivable to dispose between the driving source and the HST a speed-increasing gear mechanism including a drive shaft operatively connected to the driving source, a driven shaft disposed parallel to the drive shaft and operatively connected to the pump shaft, a drive-side gear supported by the drive shaft so as to be incapable of relative rotation, and a driven-side gear that is meshed with the drive-side gear, supported by the driven shaft so as to be incapable of relative rotation, and has a smaller diameter than the drive-side gear. This configuration, however, results in a power transmission path that is increased in size in the axial direction and the radial direction of the pump shaft.

PRIOR ART DOCUMENT

Patent Document

Patent Document 1: Japanese Patent No. 4701366

BRIEF SUMMARY

The present invention has been conceived in view of the conventional art described above, and an object of the present invention is to provide a micro-traction drive unit applicable to a hydrostatic transmission disposed in a power transmission path extending from a driving source to driven members such as travel members, wherein the micro-traction drive unit is capable of accelerating rotary power operatively transmitted from the driving source and inputting the accelerated rotary power into the hydrostatic transmission while preventing an increase in the size of the power transmission path as much as possible.

Also, an object of the present invention is to provide a hydrostatic transmission to be disposed in a power transmission path extending from a driving source to driven members such as travel members, wherein the hydrostatic transmission is capable of accelerating rotary power operatively transmitted from the driving source and inputting the accelerated rotary power into a pump shaft while preventing an increase in the size of the power transmission path as much as possible.

In order to achieve the object, the present invention provides a micro-traction drive unit capable of attachment to a hydrostatic transmission in which a hydraulic pump and a hydraulic motor that are fluidly connected to each other and at least one of which is a variable volume type are respectively supported by a pump shaft and a motor shaft so as to be incapable of relative rotation and are accommodated in an HST case, and an input end of the pump shaft extends outward from the HST case, the micro-traction drive unit including an inner ring, an outer ring, a plurality of rolling elements, a retainer retaining the plurality of rolling elements, a micro-traction drive case accommodating the inner ring, the outer ring, the plurality of rolling elements, and the retainer, and removably connected to the HST case, and a power-transmitting shaft supported by the micro-traction drive case so as to be incapable of relative rotation around an axis with respect to the retainer and positioned coaxially with the inner ring, wherein an opposite end of the power-transmitting shaft from the inner ring extends outward from the micro-traction drive case so as to form an input end operatively connected to a driving source, the micro-traction drive case has an access opening on a side that faces the HST case when connected to the HST case, and an input end of the pump shaft is removably connected to a central hole of the inner ring so as to be incapable of relative rotation around the axis via the access opening by connecting the micro-traction drive case to the HST case in such a manner that the micro-traction drive case surrounds the input end of the pump shaft.

The micro-traction drive unit according to the present invention makes it possible to increase the rotational speed of rotary power that is operatively input from the driving source and transmit the resulting rotary power having an increased rotational speed to the pump shaft of the hydrostatic transmission while preventing an increase of the size of a power-transmitting mechanism, which includes the hydrostatic transmission and the micro-traction drive unit, in the radial direction and the axial direction in reference to the pump shaft, since the micro-traction drive unit includes the inner ring, the outer ring, the plurality of rolling elements, the retainer retaining the plurality of rolling elements, the power-transmitting shaft incapable of relative rotation around the axis with respect to the retainer and positioned coaxially with the inner ring, and the micro-traction drive case, wherein the opposite end of the power-transmitting shaft from the inner ring forms the input end operatively connected to the driving source, and the rotary power having the increased rotational speed is transmitted from the inner ring to the pump shaft.

In a preferable embodiment, the retainer may have a ring-shaped retainer body that is positioned more toward one side in a rotational axis direction of the inner ring than the rolling elements are and radially between the inner ring and the outer ring in reference to the rotational axis of the inner ring and that is incapable of relative rotation around the axis with respect to the power transmission shaft, and a ring-shaped fixing member that is positioned on an opposite side of the rolling elements from the retainer body in the rotational axis direction of the inner ring and radially between the inner ring and the outer ring in reference to the rotational axis of the inner ring.

The retainer body may be configured to have, at its end face facing the fixing member, a plurality of retainer-body-side depressions that are open toward the fixing member in the rotational axis direction of the inner ring and are disposed in a circumferential direction. The fixing member may be configured to have, at its end face facing the retainer body, a plurality of fixing-member-side depressions that are open toward the retainer body in the rotational axis direction of the inner ring and are disposed in the circumferential direction.

The retainer body and the fixing member are connected to each other at a retainer-body-side connecting region positioned between one retainer-body-side depression and another retainer-body-side depression circumferentially adjacent thereto and a fixing-member-side connecting region of the fixing member corresponding to the retainer-body-side connecting region, such that the plurality of rolling elements are brought into contact with the inner ring and the outer ring and retained by the retainer-body-side depressions and the fixing-member-side depressions.

The retainer-body-side depressions and the fixing-member-side depressions may be configured to have, as viewed in a circumferential cross-section, a deepest circular arc region positioned in a deepest area of the corresponding depression, a first sloped region extending toward one side in a circumferential direction from an end on one side in the circumferential direction of the deepest circular arc region, and a second sloped region extending toward the other side in the circumferential direction from an end on the other side in the circumferential direction of the deepest circular arc region.

In this case, preferably, the deepest circular arc region has approximately the same curvature as the rolling elements, and, among the first and second sloped regions, a sloped region on a side where the sloped region is brought into contact with the rolling elements when rotation of the retainer is transmitted in an accelerated manner to the inner ring has a larger curvature than the curvatures of the rolling elements.

In any one of the above various configurations of the micro-traction drive unit according to the present invention, the micro-traction drive case is preferably connected to the HST case so as to define an inner space in a fluid-tight manner to an inner space of the HST case, and the micro-traction drive case preferably has an introduction hole for introducing traction oil into the inner space.

The present invention also provides a hydrostatic transmission, in which a hydraulic pump and a hydraulic motor that are fluidly connected to each other and at least one of which is a variable volume type are respectively supported by a pump shaft and a motor shaft so as to be incapable of relative rotation and are accommodated in an HST case, the hydrostatic transmission including a micro-traction drive unit having an inner ring, an outer ring, a plurality of rolling elements, a retainer retaining the plurality of rolling elements, a power-transmitting shaft incapable of relative rotation around an axis with respect to the retainer and positioned coaxially with the inner ring, and a micro-traction drive case accommodating the inner ring, the outer ring, the plurality of rolling elements, and the retainer and supporting the power-transmitting shaft so as to be rotatable around the axis, wherein an opposite end of the power-transmitting shaft from the inner ring extends outward from the micro-traction drive case so as to form an input end operatively connected to a driving source, and the inner ring is connected to the pump shaft so as to be incapable of relative rotation.

The hydrostatic transmission according to the present invention makes it possible to increase the rotational speed of rotary power that is operatively input from the driving source and transmit the resulting rotary power having an increased rotational speed to the pump shaft of the hydrostatic transmission while preventing an increase of the size in the radial direction and the axial direction in reference to the pump shaft, since the hydrostatic transmission includes the micro-traction drive unit that has the inner ring, the outer ring, the plurality of rolling elements, the retainer retaining the plurality of rolling elements, the power-transmitting shaft incapable of relative rotation around the axis with respect to the retainer and positioned coaxially with the inner ring, and the micro-traction drive case, wherein the opposite end of the power-transmitting shaft from the inner ring is operatively connected to the driving source, and the inner ring is connected to the pump shaft so as to be incapable of relative rotation.

Therefore, even when the allowable input rotational speed of the HST is much larger than the rated output rotational speed of the driving source, it is possible to realize a state in which the performance of the HST is fully utilized.

In a preferable embodiment, an inner space of the micro-traction drive case and an inner space of the HST case are separated from each other in a fluid-tight manner, and the micro-traction drive case has an introduction hole for introducing traction oil into the inner space.

In one embodiment, the micro-traction drive case is separate from and detachably connected to the HST case.

In another embodiment, the micro-traction drive case is integral with the HST case.

BRIEF DESCRIPTION OF THE DRAWINGS

FIG. 9 is a partial cross-sectional view of a modified example in which a connecting structure between an inner ring and a pump shaft is modified.

DETAILED DESCRIPTION

Below, one embodiment of the hydrostatic transmission according to the present invention will now be described with reference to the appended drawings.

Figure 1:
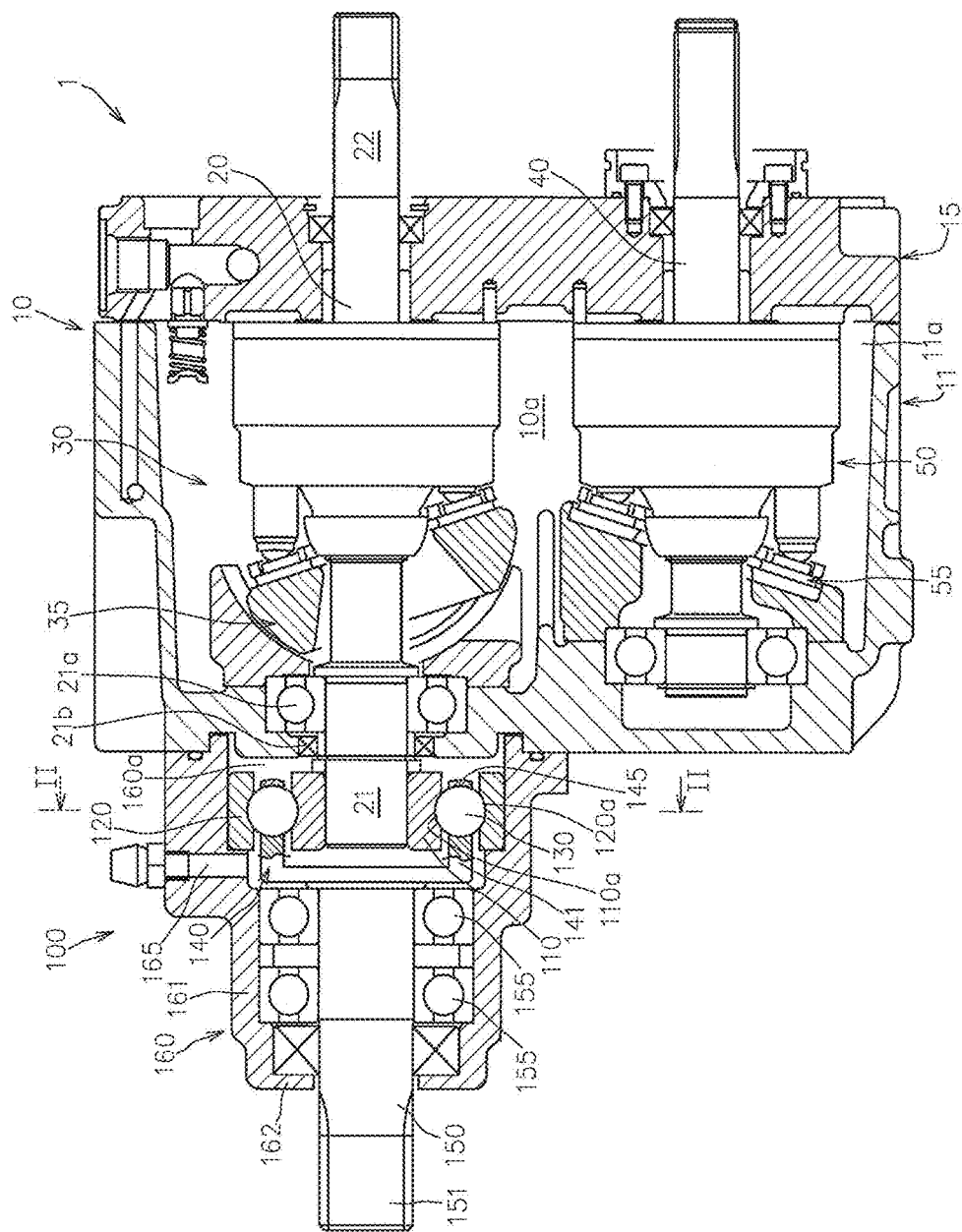
FIG. 1 is a cross-sectional view of an HST according to one embodiment of the present invention.

FIG. 1 shows a cross-sectional view of a hydrostatic transmission (HST) 1 according to this embodiment.

As shown in FIG. 1, the HST 1 includes an HST case 10, a pump shaft 20 and a motor shaft 40 supported by the HST case 10 so as to be rotatable around the respective axes, a hydraulic pump 30 supported by the pump shaft 20 so as to be incapable of relative rotation and accommodated in the HST case 10, and a hydraulic motor 50 supported by the motor shaft 40 so as to be incapable of relative rotation and accommodated in the HST case 10.

A first end 21 of the pump shaft 20 forms an input end that is operatively connected to a driving source (not shown).

In this embodiment, as shown in FIG. 1, the pump shaft 20 is supported by the HST case 10 so as to be rotatable around the axis such that the first end 21 that forms the input end and a second end 22 on the opposite side from the first end 21 both extend outward from the HST case 10.

The second end 22 of the pump shaft 20 acts as an output end that outputs rotary power to a driven member, such as a charge pump, to be driven by rotary power from the driving source.

The motor shaft 40 acts as an output shaft of the HST 1.

The motor shaft 40 is supported by the HST case 10 so as to be rotatable around the axis such that the end that forms an output end extends outward from the HST case 10.

In this embodiment, as shown in FIG. 1, the motor shaft 40 is disposed parallel to the pump shaft 20, and the end of the motor shaft 40 on the same side as the second end 22 of the pump shaft 20 extends outward from the HST case 10 and serves as an output end.

The hydraulic pump 30 and the hydraulic motor 50 are fluidly connected to each other, and at least one of which has a variable volume.

Specifically, the HST 1 has a pump swash plate 35 and a motor swash plate 55 that define the capacities of the hydraulic pump 30 and the hydraulic motor 50, respectively.

As shown in FIG. 1, in this embodiment, the pump swash plate 35 is a movable swash plate, and the motor swash plate 55 is a fixed swash plate.

A pair of hydraulic oil passages (not shown) that fluidly connect the hydraulic pump 30 and the hydraulic motor 50 are formed in the HST case 10.

Specifically, the HST case 10 has an HST case body 11 with an opening 11a on one side in the rotational axis direction and a port block 15 removably connected to the HST case 11 so as to block the opening 11a.

The hydraulic pump 30 and the hydraulic motor 50 are in sliding-contact with the inner surface of the port block 15 and are accommodated in an HST accommodating space 10a defined by the HST case body 11 and the port block 15.

In this configuration, the pair of hydraulic oil passages are formed in the port block 15.

As shown in FIG. 1, the HST 1 according to this embodiment further includes a micro-traction drive unit 100.

The micro-traction drive unit 100 acts as an accelerating power-transmitting mechanism that accelerates rotary power operatively input from the driving source and transmits the accelerated rotary power to the pump shaft 20.

Figure 2:
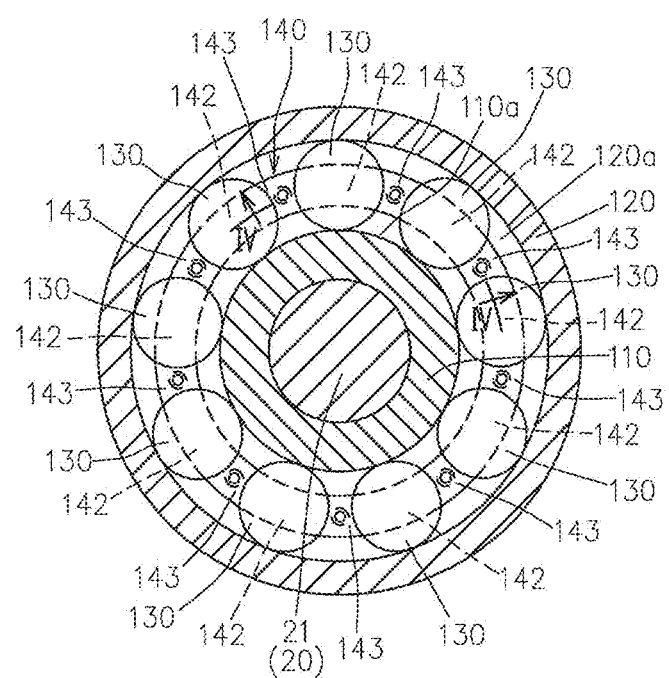
FIG. 2 is a cross-sectional view taken along the line II-II in FIG. 1.

FIG. 2 shows a cross-sectional view taken along the line II-II in FIG. 1.

As shown in FIGS. 1 and 2, the micro-traction drive unit 100 includes an inner ring 110, an outer ring 120, a plurality of rolling elements 130, a retainer 140 retaining the plurality of rolling elements 130, and a power-transmitting shaft 150 disposed coaxially with the inner ring 110 and made incapable of relative rotation around the axis relative to the retainer 140.

The inner ring 110 is connected to the input end 21 of the pump shaft 20 so as to be incapable of relative rotation around the axis, and acts as an output member of the micro-traction drive unit 100 that transmits rotary power to the pump shaft 20.

Specifically, the inner ring 110 has a ring-like shape having a central hole that penetrates the inner ring 110 in the rotational axis direction, and is disposed around the input end 21 of the pump shaft 20 so as to be incapable of relative rotation around the axis.

The outer ring 120 has a ring-like shape surrounding the inner ring 110 so as to define an accommodating space for the plurality of rolling elements 130 between the inner circumferential surface of the outer ring 120 and the outer circumferential surface of the inner ring 110.

Specifically, as shown in FIG. 2, the outer circumferential surface of the inner ring 110 has an inner-ring-side lane 110a that is open radially outward so as to receive part of the plurality of rolling elements 130, and the inner circumferential surface of the outer ring 120 has an outer-ring-side lane 120a that faces the inner-ring-side lane 110a and receives part of the plurality of rolling elements 130.

The retainer 140 retains the plurality of rolling elements 130 so as to rotate around the rotational axis of the inner ring 110 in accordance with the orbital rotation of the plurality of rolling elements 130 around the inner ring 110, while allowing the rolling elements 130 to rotate around the respective axes parallel to the rotational axis of the inner ring 110.

Figure 3:
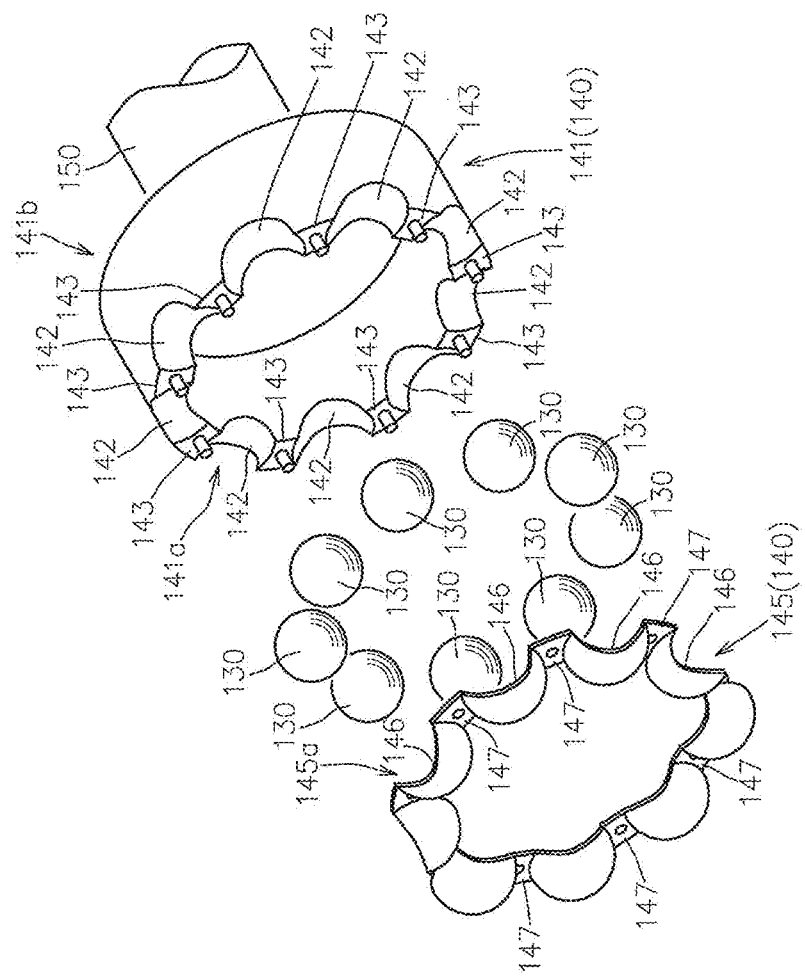
FIG. 3 is an exploded perspective view of a retainer and a plurality of rolling elements in the HST.

FIG. 3 shows an exploded perspective view of the retainer 140 and the plurality of rolling elements 130.

As shown in FIGS. 1 to 3, in this embodiment, balls are used as the rolling elements 130.

The retainer 140 has a retainer body 141 and a fixing member 145 that are placed in a space provided radially between the outer circumferential surface of the inner ring 110 and the inner circumferential surface of the outer ring 120 in reference to the rotational axis of the inner ring 110, and are disposed so as to face each other in the rotational axis direction, with the rolling elements 130 in-between.

The retainer body 141 is disposed on one side in the rotational axis direction so as to be closer to the power-transmitting shaft 150 than the rolling elements 130 are, has a counter end face on a side 141a facing the rolling elements 130, and is connected to the power-transmission shaft 150 on a side 141b far from the rolling elements 130 so as to be incapable of relative rotation around the axis.

Note that the term "connected" as used herein encompasses a configuration where the retainer body 141 and the power-transmitting shaft 150 that are separately formed are made incapable of relative rotation around the axis by a fastening means, and a configuration where the retainer body 141 and the power-transmitting shaft 150 are integrally formed and are thereby made incapable of relative rotation around the axis.

In this embodiment, as shown in FIGS. 1 and 3, the retainer body 141 and the power-transmitting shaft 150 are integrally formed.

The counter end face 141a of the retainer body 141 has a plurality of hemispherical retainer-body-side depressions 142 that are arranged in the circumferential direction and open toward the rolling elements 130 in the rotational axis direction of the inner ring 110.

On the other hand, the fixing member 145 is disposed so as to face the retainer body 141, with the rolling elements 130 in-between. A counter end face 145a of the fixing member 145 facing the rolling elements 130 has a plurality of hemispherical fixing-member-side depressions 146 that are open toward the rolling elements 130 so as to be positioned in circumferentially the same places as the plurality of retainer-body-side depressions 142.

The retainer body 141 and the fixing member 145 are connected to each other at retainer-body-side connecting regions 143 each positioned between one retainer-body-side depression 142 and another retainer-body-side depression 142 circumferentially adjacent thereto and fixing-member-side connecting regions 147 of the fixing member 145 corresponding to the retainer-body-side connecting regions 143, such that the plurality of rolling elements 130 are brought into contact with the inner ring 110 and the outer ring 120 and retained by the retainer-body-side depressions 142 and the fixing-member-side depressions 146.

As shown in FIG. 3, in this embodiment, cramping pins project from the retainer-body-side connecting regions 143, holes into which the cramping pins are inserted are provided in the fixing-member-side connecting regions 147, and the retainer body 141 and the fixing member 145 are connected via the cramping pins and the holes.

Thus, in this embodiment, the retainer body 141 and the fixing member 145 that are separately formed are connected, and, accordingly, the retainer-body-side depressions 142 and the fixing-member-side depressions 146 form spherical retaining spaces for the rolling elements 130.

Moreover, in this embodiment, an increase in power transmission efficiency is provided by the following configuration.

Figure 4:
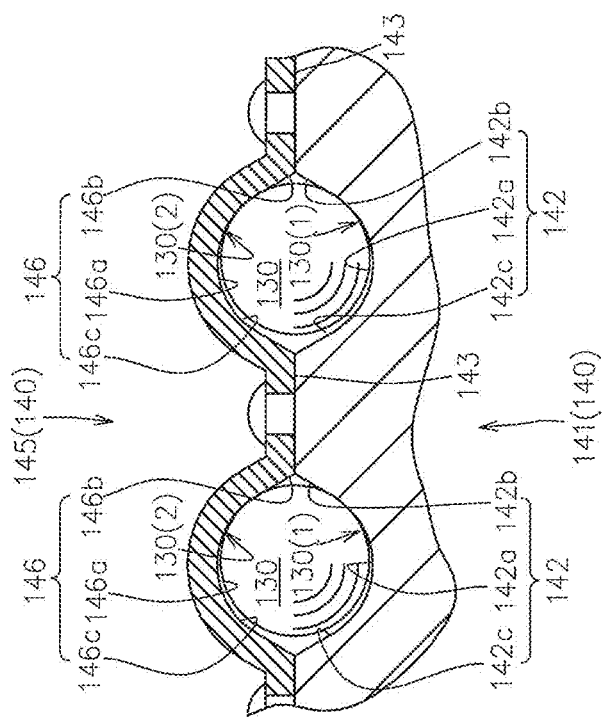
FIG. 4 is a cross-sectional view taken along the line IV-IV in FIG. 2.

FIG. 4 shows a cross-sectional view taken along the line IV-IV in FIG. 2.

Figure 5:
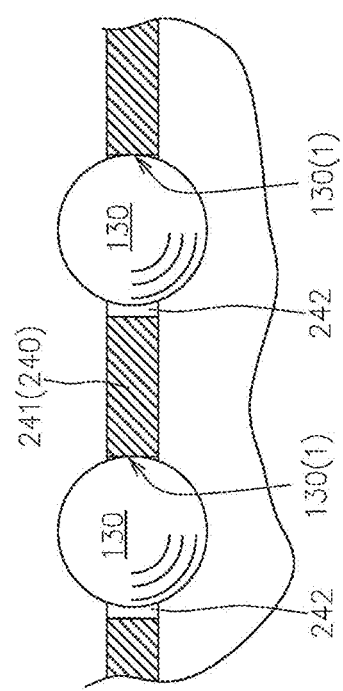
FIG. 5 shows a cross-sectional view, corresponding to FIG. 4, of a retainer 240 having a configuration different from the retainer 140.

Also, FIG. 5 shows a cross-sectional view, corresponding to FIG. 4, of a retainer 240 having a configuration different from the retainer 140.

As shown in FIG. 5, the retainer 240 has a cylindrical peripheral wall 241 positioned between the inner ring 110 and the outer ring 120.

The peripheral wall 241 has radially penetrating through-holes 242 in the circumferential direction, the number of which corresponds to the number of rolling elements 130, and by inserting the rolling elements 130 into the through-holes 242, a state in which the rolling elements 130 are retained is reached.

Meanwhile, in the configuration shown in FIG. 5, the inner diameters of the through-holes 242 are larger than the outer diameters of the rolling elements 130 in order to insert the rolling elements 130 into the through-holes 242.

Accordingly, when the rolling elements 130 orbit the outer circumferential surface of the inner ring 110 in accordance with the rotation of the retainer 240 while rotating around their own rotational centers, essentially only one point 130(1) of each rolling element 130 is brought into contact with the inner circumferential surface of each through-hole 242.

On the other hand, in this embodiment, as shown in FIG. 4, the retainer-body-side depressions 142 as viewed in a circumferential cross-section each have a deepest circular arc region 142a positioned in the deepest area of the retainer-body-side depressions 142, a first sloped region 142b extending toward one side in the circumferential direction from the end on one side in the circumferential direction of the deepest circular arc region 142a and reaching the attachment surface of the retainer body 141, and a second sloped region 142c extending toward the other side in the circumferential direction from the end on the other side in the circumferential direction of the deepest circular arc region 142a and reaching the attachment surface of the retainer body 141.

Likewise, the fixing-member-side depressions 146 as viewed in a circumferential cross-section each have a deepest circular arc region 146a positioned in the deepest area of the fixing-member-side depressions 146, a first sloped region 146b extending toward one side in the circumferential direction from the end on one side in the circumferential direction of the deepest circular arc region 146a and reaching the attachment surface of the fixing member 145, and a second sloped region 146c extending toward the other side in the circumferential direction from the end on the other side in the circumferential direction of the deepest circular arc region 146a and reaching the attachment surface of the fixing member 145.

The retainer-body-side depressions 142 and the fixing-member-side depressions 146 are configured such that the deepest circular arc regions 142a, 146a have approximately the same curvature as the rolling elements 130 and, on the other hand, among the first sloped regions 142b, 146b and the second sloped regions 142c, 146c, sloped regions on the side where they are brought into contact with the rolling elements 130 when the rotation of the retainer 140 is transmitted in an accelerated manner to the inner ring 110 (for example, the first sloped regions 142b, 146b) have a larger curvature than the curvature of the rolling elements 130 (in other words, a gently sloped surface is formed).

According to this configuration, when rotary power is transmitted from the retainer 140 to the inner ring 110 in an accelerated manner, two points of each rolling element 130 are brought into contact with the retainer-body-side depression 142 and the fixing-member-side depression 146, which form the approximately spherical retaining space, at two points (the two points including one point 130(1) in the first sloped region 142b in the retainer-body-side depression 142 and one point 130(2) in the first sloped region 146b in the fixing-member-side depression 146). Accordingly, an increased smoothness of the rotational movement and the orbital movement of the rolling elements 130 can be attained, and a higher power transmission efficiency can be effectively attained than with the configuration shown in FIG. 5.

In this embodiment, the micro-traction drive unit 100 is removably connected to the HST case 10.

Specifically, as shown in FIG. 1, the micro-traction drive unit 100 has a micro-traction drive case 160 that is separate from the HST case 10 and removably connected thereto.

The micro-traction drive case 160 accommodates the inner ring 110, the outer ring 120, the plurality of rolling elements 130, and the retainer 140, and supports the power-transmitting shaft 150 so as to be rotatable around the axis and coaxial with the inner ring 110.

Specifically, the micro-traction drive case 160 has a peripheral wall 161 surrounding the inner ring 110, the retainer 140, the plurality of rolling elements 130, and the outer ring 120, an end wall 162 blocking the opposite side of the peripheral wall 161 from the HST case 10 when connected to the HST case 10, and an access opening 160a on the side facing the HST case 10 when connected to the HST case 10.

The power-transmitting shaft 150 is supported by the inner circumferential surface of the peripheral wall 161 via bearing members 155 so as to be rotatable around the axis such that an input end 151 operatively connected to the driving source extends outward from the end wall 162.

By connecting the micro-traction drive case 160 to the HST case 10, the input end 21 of the pump shaft 20 is disposed inside the central opening of the inner ring 110 via the access opening 160a so as to be incapable of relative rotation around the axis.

As explained above, the HST 1 according to this embodiment includes the micro-traction drive unit 100 and, thereby, the following effects can be obtained.

That is, rotary power operatively transmitted from the driving source is transmitted in an accelerated manner to the inner ring 110 via the power-transmitting shaft 150 as well as the retainer 140 and the plurality of rolling elements 130 that rotate together with the power-transmitting shaft 150, and input into the pump shaft 20 from the inner ring 110.

Therefore, even when the allowable input rotational speed of the HST 1 is much larger than the rated output rotational speed of the driving source, the speed of rotary power input into the pump shaft 20 can be converted to a speed at which sufficient performance of the HST 1 can be obtained, and stepless speed varying operations can be performed in a state in which the performance of the HST is fully utilized.

Moreover, since the pump shaft 20 is inserted into the central hole of the inner ring 110, and the power-transmitting shaft 150 is disposed coaxially with the inner ring 110, an increase of the overall size of the HST 1 in the radial direction and the axial direction in reference to the pump shaft 20 caused by provision of the micro-traction drive unit 100 can be prevented as much as possible.

In order to effectively perform power transmission by the micro-traction drive unit 100, it is desirable to apply a normal force that presses the rolling elements 130 toward the outer circumferential surface of the inner ring 110.

The normal force can be obtained by setting the outer diameter of the outer ring 120 and the inner diameter of the case 160 such that the outer ring 120 is contracted in the radially inward direction by disposing the outer ring 120 inside the case 160, and/or setting the inner diameter of the central hole of the inner ring 110 and the outer diameter of the pump shaft 20 such that the inner ring 110 is expanded in the radially outward direction by disposing the pump shaft 20 inside the central hole of the inner ring 110.

Note that, the above configurations involve deformation of the outer ring 120 and/or the inner ring 110 in radial directions and thus may result in poor durability.

In this regard, for example, it is also possible to obtain the normal force by way of a configuration in which a pressing force in the axial direction is exerted on the inner ring 110 (hereinafter referred to as a first configuration) and/or a configuration in which a pressing force in the axial direction is exerted on the outer ring 120 (hereinafter referred to as a second configuration), based on the premise that the inner ring 110, the plurality of rolling elements 130, and the outer ring 120 form an angular contact ball bearing structure.

Figure 6A:
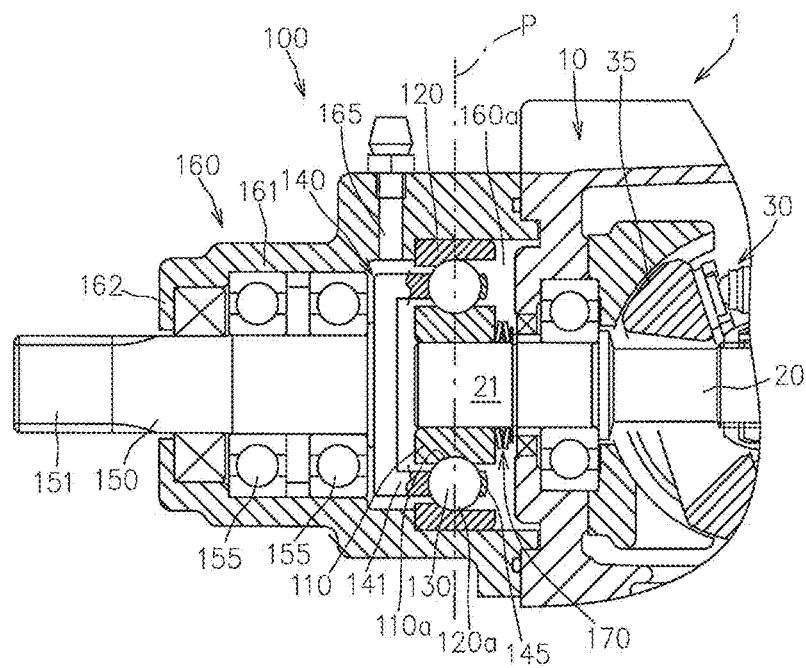
FIG. 6A and FIG. 6B are partial cross-sectional views of one exemplified configuration and another exemplified configuration, respectively, for exerting a normal force on the plurality of rolling elements, respectively.
Figure 6B:
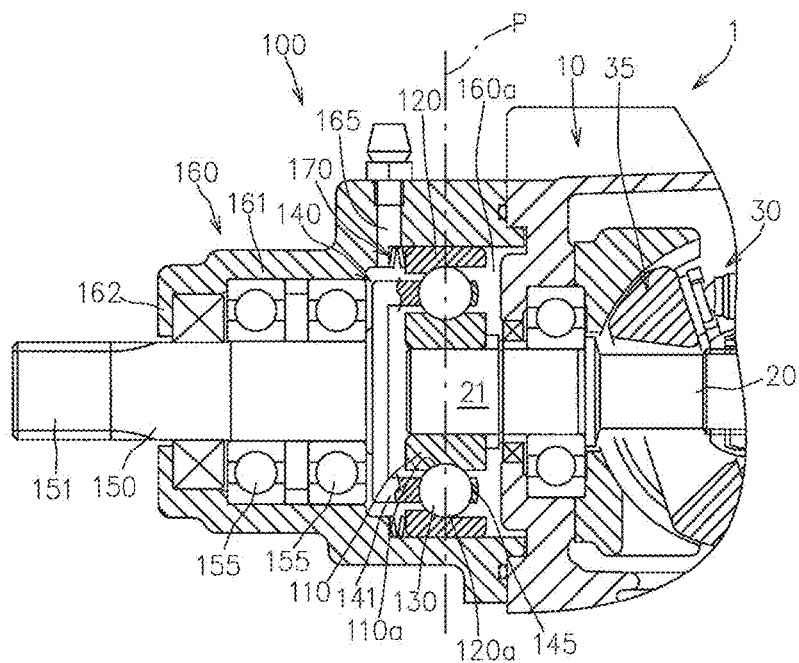

FIG. 6A and FIG. 6B show partial cross-sectional views of the first configuration and the second configuration, respectively.

As shown in FIG. 6A, in the first configuration, the inner-ring-side lane 110a is symmetrical in reference to an imaginary center plane P extending in the radial direction through the centers of the rolling elements 130, while the outer-ring-side lane 120a is asymmetrical in reference to the imaginary center plane P.

Specifically, the outer-ring-side lane 120a is positioned more toward one side in the rotational axis direction than the imaginary center plane P is (on the side far from the HST case 10 in the depicted embodiment), and has a depressed engagement surface that prevents the relative movement of the rolling elements 130 toward one side in the rotational axis direction relative to the outer ring 120.

The outer ring 120 is fixed in place so as to be immovable toward one side in the rotational axis direction, and the inner ring 110 supported by the pump shaft 20 so as to be movable in the axial direction receives an axial load toward one side in the rotational axis direction exerted by a biasing member 170 such as a coned disc spring.

According to this configuration, a normal force in the radially inward direction is exerted on the rolling elements 130 due to the axial load on the inner ring 110 via the depressed engagement surface without resulting in the deformation of the inner ring 110 and the outer ring 120.

As shown in FIG. 6B, in the second configuration as well, while the inner-ring-side lane 110a is symmetrical in reference to the imaginary center plane P, the outer-ring-side lane 120a is positioned more toward one side in the rotational axis direction than the imaginary center plane P is (on the side far from the HST case 10 in the depicted embodiment), has a depressed engagement surface that prevents the relative movement of the rolling elements 130 toward one side in the rotational axis direction relative to the outer ring 120, and is asymmetrical in reference to the imaginary center plane P.

The inner ring 110 is fixed in place so as to be immovable toward the other side in the rotational axis direction (the side close to the HST case 10 in the depicted embodiment), and the outer ring 120 accommodated in the case so as to be movable in the axial direction receives an axial load toward the other side in the rotational axis direction exerted by a biasing member 170 such as a coned disc spring.

According to the second configuration as well, a normal force in the radially inward direction is exerted on the rolling elements 130 due to the axial load on the outer ring 120 via the depressed engagement surface without resulting in the deformation of the inner ring 110 and the outer ring 120.

Preferably, an introduction hole 165 for introducing traction oil into a micro-traction drive accommodating space can be provided, based on the premise that the micro-traction drive accommodating space for accommodating the inner ring 110, the plurality of rolling elements 130, the retainer 140, and the outer ring 120 defined by the micro-traction drive case 160 is separated in a fluid-tight manner from the HST accommodating space for accommodating the hydraulic pump 30 and the hydraulic motor 50 defined by the HST case 10.

In this embodiment, as shown in FIG. 1, the first end 21 forming the input end extends outward via a bearing hole formed in the HST case 10, an oil seal 21b is disposed in the bearing hole together with a bearing member 21a supporting the pump shaft 10 so as to be rotatable, and, accordingly, the HST accommodating space of the HST case 10 and the micro-traction drive accommodating space of the micro-traction drive case 160 are separated in a fluid-tight manner.

The durability of the micro-traction drive can be increased by this configuration.

As described above, in this embodiment, the micro-traction drive case 160 is a component separate from the HST case 10, but the present invention is not limited to such an embodiment.

Figure 7:
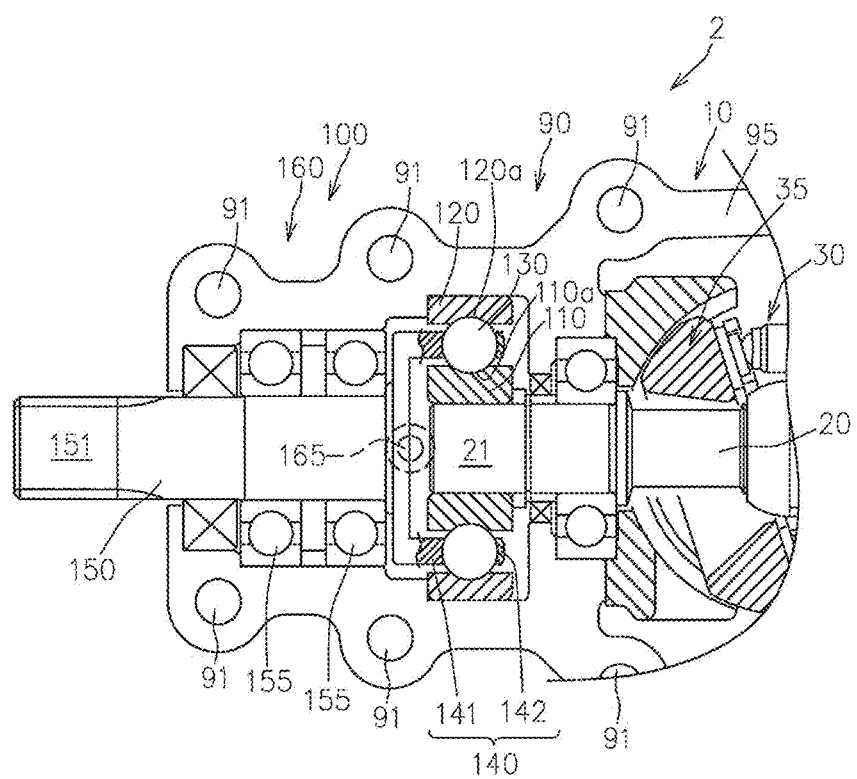
FIG. 7 is a partial cross-sectional view of a modified example of the HST.

That is, as shown in FIG. 7, the micro-traction drive case 160 and the HST case 10 can be formed integrally.

Specifically, an HST 2 according to a modification shown in FIG. 7 has a casing 90 having the HST case 10 and the micro-traction drive case 160 in an integral manner.

The casing 90 has a two-part structure that includes two halves divided at a diving plane 95 passing through the center lines of the pump shaft 20 and the motor shaft 40, and the two divided halves are connected to each other by utilizing fastening holes 91 or the like.

Figure 8:
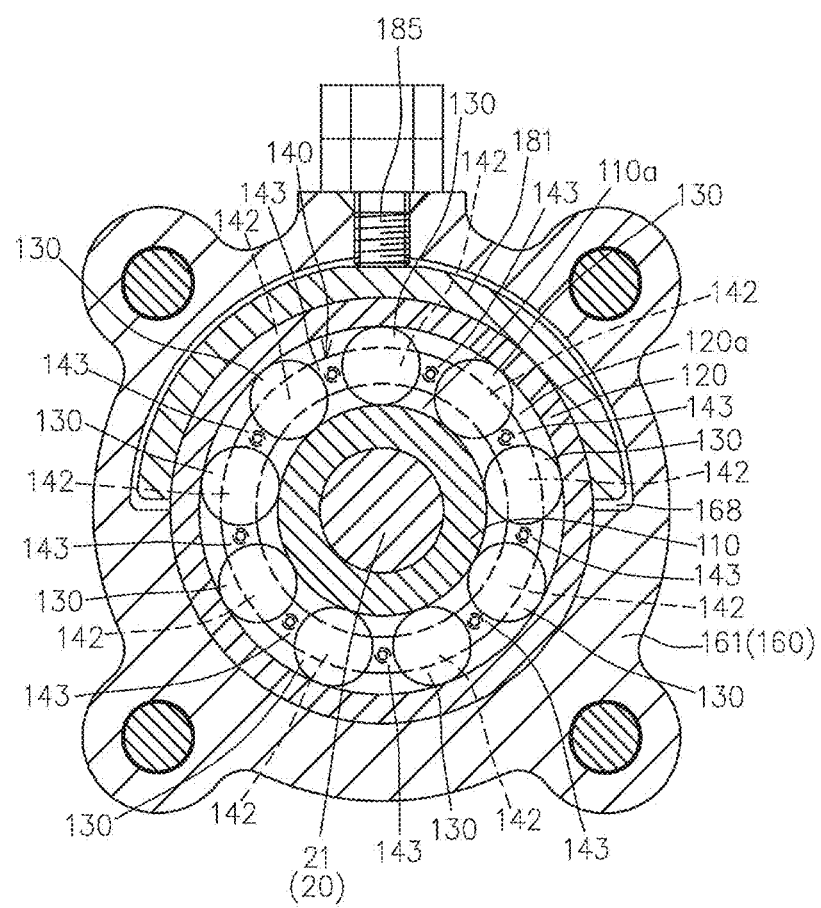
FIG. 8 is a cross-sectional view of still another exemplified configuration for exerting the normal force on the rolling elements.

FIG. 8 shows a modified configuration for exerting the normal force on the rolling elements 130.

In the drawing, the same components as those in the above embodiment and other modifications are given the same reference numbers, and detailed descriptions thereof are omitted.

In the embodiment shown in FIG. 1, the embodiment shown in FIG. 6A, and the embodiment shown in FIG. 6B, the normal force is in advance exerted on the rolling elements 130 at the time the inner ring 110, the rolling elements 130, the retainer 140, and the outer ring 120 are installed into the micro-traction drive case 160.

In other words, it is necessary to install the above components into the case 160 in a state in which the normal force is exerted on the rolling elements 130.

On the other hand, in the embodiment shown in FIG. 8, the inner ring 110, the rolling elements 130, the retainer 140, and the outer ring 120 can be installed into the micro-traction drive case 160 in a state in which the normal force is not exerted on the rolling elements 130, and the normal force can be exerted after installation.

Specifically, the embodiment shown in FIG. 8 includes a cover 181 covering a part of the outer circumferential surface of the outer ring 120 and a pressing mechanism 185 exerting a pressing force in the diameter-reducing direction on the outer ring 120 via the cover 181, and the normal force can be exerted on the rolling elements 130 by the pressing mechanism 185 that reduces the diameter of the outer ring 120 via the cover 181.

In the embodiment shown in FIG. 8, a portion of the inner surface of the micro-traction drive case 160 facing approximately half the outer circumferential surface of the outer ring 120 has a pocket 168 depressed in the radially outward direction in reference to the rotational axis of the inner ring 110, and the cover 181 is accommodated in the pocket 168.

The pressing mechanism 185 has a screw member screwed into the case 160 in the radial direction in reference to the rotational axis of the inner ring 110, such that one end is brought into contact with the outer circumferential surface of the cover 181, and the other end can be operated from outside the micro-traction drive case 160.

By adjusting the axial-direction position (the insertion position) of the screw member, the extent of reducing the diameter of the outer ring 120 via the cover 181 can be changed, and, accordingly, a suitable normal force can be exerted on the rolling elements 130.

In the embodiment shown in FIG. 1, it is necessary to provide a tightening margin between the outer ring 120 and the case 160 and/or between the inner ring 110 and the pump shaft 20 to obtain the normal force.

Moreover, in the embodiments shown in FIG. 6A and FIG. 6B, it is necessary to install the aforementioned components into the case 160 such that the biasing means 170 for obtaining the normal force becomes resilient.

On the other hand, in the embodiment shown in FIG. 8, the aforementioned components can be easily installed into the case 160.

In a configuration where it is not necessary to provide a tightening margin between the inner ring 110 and the pump shaft 20 for the exertion of the normal force, the inner ring 110 and the pump shaft 20 can be preferably connected via splines 25 as shown in FIG. 9, and, accordingly, the efficiency of transmitting torque from the inner ring 110 to the pump shaft 20 can be increased.

DESCRIPTION OF THE REFERENCE NUMERALS 1, 2 hydrostatic transmission (HST)
10 HST case
21 input end of pump shaft
30 hydraulic pump
40 motor shaft
50 hydraulic motor
82 PTO transmission
95 PTO shaft
95a PTO rotation sensor
100 micro-traction drive unit
110 inner ring
120 outer ring
130 rolling element
140 retainer
141 retainer body
142 retainer-body-side depression
143 retainer-body-side connecting region
145 fixing member
146 fixing-member-side depression
147 fixing-member-side connecting region
150 power-transmitting shaft
151 input end of power-transmitting shaft
160 micro-traction drive case
160a access opening
165 introduction hole

What is claimed is:

1. A micro-traction drive unit capable of attachment to a hydrostatic transmission ("HST") in which a hydraulic pump and a hydraulic motor that are fluidly connected to each other and at least one of which is a variable volume type are respectively supported by a pump shaft and a motor shaft so as to be incapable of relative rotation and are accommodated in an HST case, and an input end of the pump shaft extends outward from the HST case, the micro-traction drive unit comprising:

an inner ring;
an outer ring;
a plurality of rolling elements;
a retainer retaining the plurality of rolling elements;
a micro-traction drive case accommodating the inner ring, the outer ring, the plurality of rolling elements, and the retainer, and removably connected to the HST case such that the micro-traction drive case is directly connected to the HST case, wherein the micro-traction drive case comprises a continuous peripheral wall that surrounds at least the inner ring, the outer ring, the plurality of rolling elements, and the retainer; and
a power-transmitting shaft supported by the micro-traction drive case and incapable of rotation relative to the retainer and positioned coaxially with the inner ring, wherein an opposite end of the power-transmitting shaft from the inner ring extends outward from the micro-traction drive case so as to form an input end operatively connected to a driving source;

the micro-traction drive case has an access opening on a side that faces the HST case when connected to the HST case; and the input end of the pump shaft is removably connected via the access opening to a central hole of the inner ring so as to be incapable of rotation relative to the inner ring, wherein the micro-traction drive case is directly connected to the HST case in such a manner that the peripheral wall of the micro-traction drive case surrounds the input end of the pump shaft.

2. The micro-traction drive unit according to claim 1, wherein the retainer has a ring-shaped retainer body that is positioned more toward one side in a rotational axis direction of the inner ring than the rolling elements are and radially between the inner ring and the outer ring in reference to the rotational axis of the inner ring and that is incapable of relative rotation around the axis with respect to the power transmission shaft, and a ring-shaped fixing member that is positioned on an opposite side of the rolling elements from the retainer body in the rotational axis direction of the inner ring and radially between the inner ring and the outer ring in reference to the rotational axis of the inner ring;

an end face of the retainer body facing the fixing member has a plurality of retainer-body-side depressions that are open toward the fixing member in the rotational axis direction of the inner ring and are disposed along a circumferential direction;

an end face of the fixing member facing the retainer body has a plurality of fixing-member-side depressions that are open toward the retainer body in the rotational axis direction of the inner ring and are disposed in the circumferential direction; and the retainer body and the fixing member are connected to each other at a retainer-body-side connecting region positioned between one retainer-body-side depression and another retainer-body-side depression circumferentially adjacent thereto and a fixing-member-side connecting region of the fixing member corresponding to the retainer-body-side connecting region, such that the plurality of rolling elements are brought into contact with the inner ring and the outer ring and retained by the retainer-body-side depressions and the fixing-member-side depressions.

3. The micro-traction drive unit according to claim 2, wherein the retainer-body-side depressions and the fixing-member-side depressions as viewed in a circumferential cross-section have a deepest circular arc region positioned in a deepest area of the corresponding depression, a first sloped region extending toward one side in a circumferential direction from an end on one side in the circumferential direction of the deepest circular arc region, and a second sloped region extending toward the other side in the circumferential direction from an end on the other side in the circumferential direction of the deepest circular arc region; and the deepest circular arc region has approximately the same curvature as the rolling elements, and, among the first and second sloped regions, a sloped region on a side where the sloped region is brought into contact with the rolling elements when rotation of the retainer is transmitted in an accelerated manner to the inner ring has a larger curvature than the curvatures of the rolling elements.

4. The micro-traction drive unit according to claim 3, wherein the micro-traction drive case is connected to the HST case so as to define an inner space that is separated in a fluid-tight manner from an inner space of the HST case; and the micro-traction drive case has an introduction hole for introducing traction oil into the inner space.

5. The micro-traction drive unit according to claim 2, wherein the micro-traction drive case is connected to the HST case so as to define an inner space that is separated in a fluid-tight manner from an inner space of the HST case; and the micro-traction drive case has an introduction hole for introducing traction oil into the inner space.

6. The micro-traction drive unit according to claim 2, further comprising:

a plurality of cramping pins disposed on the retainer body; and a plurality of holes disposed on the fixing member, wherein the cramping pins are inserted into the holes when the fixing member and the retainer body are connected.

7. The micro-traction drive unit according to claim 1, wherein the micro-traction drive case is connected to the HST case so as to define an inner space that is separated in a fluid-tight manner from an inner space of the HST case; and the micro-traction drive case has an introduction hole for introducing traction oil into the inner space.

8. A hydrostatic transmission ("HST"), wherein a hydraulic pump and a hydraulic motor, fluidly connected to each other and at least one of which is a variable volume type are respectively supported by a pump shaft and a motor shaft so as to be incapable of relative rotation and are accommodated in an HST case, the hydrostatic transmission comprising:

a micro-traction drive unit having an inner ring, an outer ring, a plurality of rolling elements, a retainer retaining the plurality of rolling elements, a power-transmitting shaft incapable of rotation relative to the retainer and positioned coaxially with the inner ring, and a micro-traction drive case accommodating the inner ring, the outer ring, the plurality of rolling elements, and the retainer and supporting the power-transmitting shaft so as to be rotatable around its axis, wherein the micro-traction drive case comprises a continuous peripheral wall that surrounds at least the inner ring, the outer ring, the plurality of rolling elements, and the retainer, wherein the micro-traction drive case is directly connected to the HST case, and wherein an opposite end of the power-transmitting shaft from the inner ring extends outward from the micro-traction drive case so as to form an input end operatively connected to a driving source, and wherein the inner ring is connected to the pump shaft so as to be incapable of relative rotation and the micro-traction drive case surrounds an input end of the pump shaft.

9. The hydrostatic transmission according to claim 8, wherein an inner space of the micro-traction drive case and an inner space of the HST case are separated from each other in a fluid-tight manner; and the micro-traction drive case has an introduction hole for introducing traction oil into the inner space.

* * * * *